Patented Mar. 2, 1943

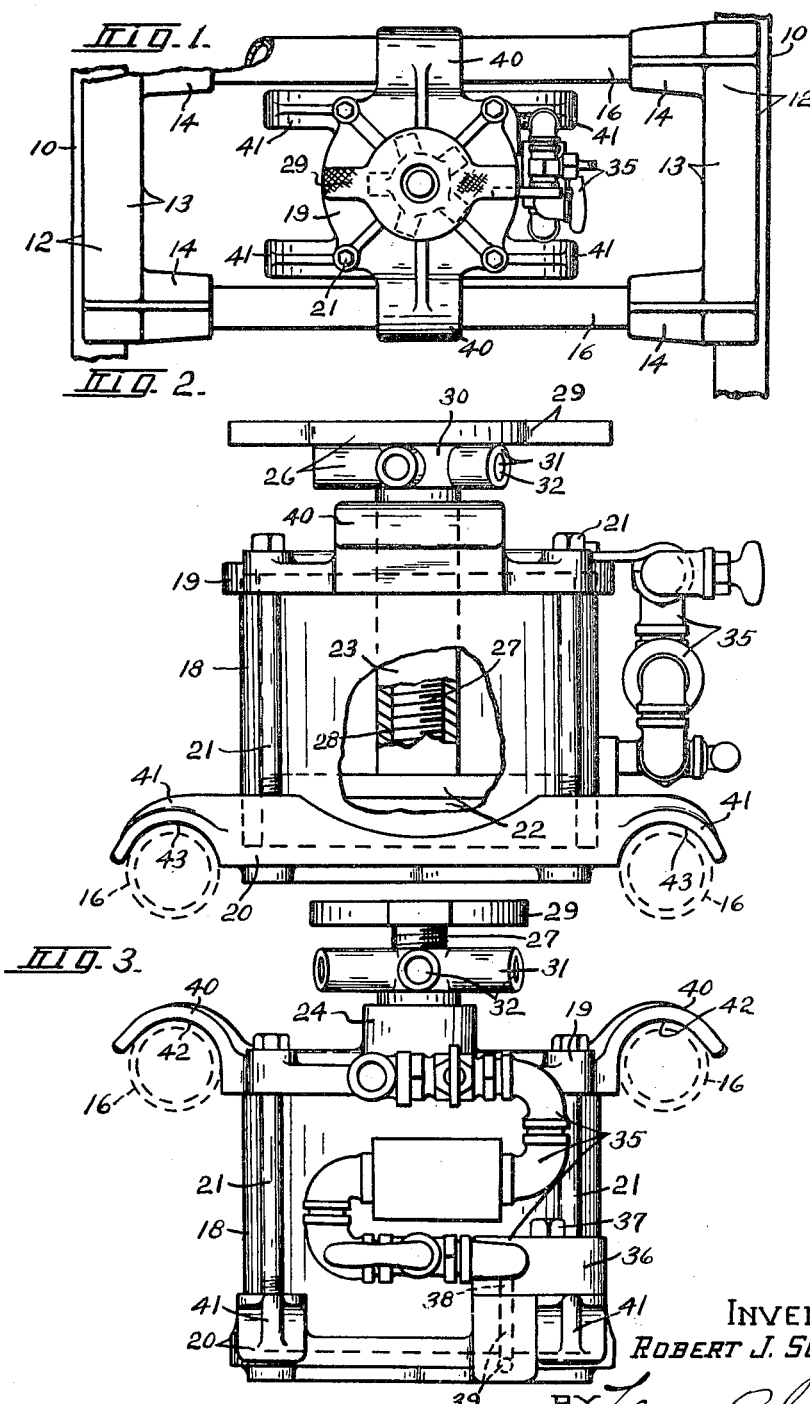

2,312,850

UNITED STATES PATENT OFFICE 2,312,850

CAR ROCKING IMPLEMENT

Robert J. Scharoun, Pulaski, N. Y., assignor to Scharoun Industries, Inc., Pulaski, N. Y., a corporation of New York Application August 30, 1941, Serial No. 409,045

1 Claim. (Cl. 73—51)

My invention relates to improvement in portable car rocking implements in which a vertical reciprocating piston operates in conjunction with a lift jack. The invention pertains more particularly to a combined lifting and vibratory jack adapted to be mounted beneath a car upon a suitable support such as an automobile lifting device for engagement with some convenient portion of the car such as an axle, a sill or the under portion of the motor mechanism for imparting a rocking or vibratory motion to the car whereby body squeaks and rattles may be readily located.

In car rocking or vibrating implements of the above mentioned class, it is necessary that they be of relatively short, compact structure particularly when collapsed so that a car having a relatively low chassis may be driven into and out of cooperative relation with a car lift without it being necessary to remove the implement from operative association with the car lift. In so far as applicant is aware, car rocking implements of this character, as heretofore constructed, have often necessitated the use of shims, blocks, or other spacing members in conjunction with the jacks of the implement in order that said implement may be operatively associated with cars having a relatively high chassis or frame and, at the same time, have the implement so constructed that cars having a relatively low chassis or frame may be driven into or out of cooperative relation with the car lift when the rocking implement is collapsed without necessitating the removal of the implement from supporting relation with the car lift.

An object of this invention is to produce a portable car rocking or vibrating implement which is adapted to be quickly and easily adjusted vertically with respect to a supporting member carried by a car lift or the like so that the implement may be used for rocking or vibrating cars mounted on said lift having a relatively high chassis or frame as well as those having a relatively low chassis or frame without the use of blocks or shims or loose attachments and at the same time be able to so adjust the implement with respect to the support therefor when not being used that cars of all makes and sizes may be freely moved over the implement into and out of cooperative relation with the car lift or other support therefor.

Another object of the invention is to produce a combination car lifting and vibrating implement of the above mentioned class which is strong, compact and simple in construction and that is quick, easy and dependable in operation.

These and other objects and advantages pertaining to the specific construction and operation of my car rocking implement will more fully appear from the following description taken in conjunction with the accompanying drawing in which:

Figure 1 is a top plan of a car rocking implement embodying the various features of my invention. A suitable supporting means is illustrated having the implement mounted thereon.

Figure 2 is a side elevation on an enlarged scale of the implement shown in Figure 1, center portions of the implement being broken away and shown in section to better illustrate the inner mechanism thereof.

Figure 3 is a side elevation of the implement illustrated in Figure 1 showing the implement as viewed at substantially right angles to the view of said implement shown in Figure 2.

My improved car rocking implement, as shown in the drawing, is adapted to be used more particularly in conjunction with a conventional construction car lifting apparatus. I, therefore, have illustrated in Figure 1 portions of the rails 10 of a conventional car lift, said rails being spaced apart such a distance that when an automobile is positioned over the lift in cooperative relation therewith and the rails are moved upward, they engage intermediate portions of the front and rear axles at opposite sides of the longitudinal center of the automobile.

In order to readily support my car rocking implement upon the rails 10, I have shown a cradle 12 adapted to extend transversely of the lift between said rails. The cradle 12, as illustrated, comprises a pair of end or head members 13 which, in this instance, are angle plates adapted to engage the upper and inner surfaces of the respective rail 10. Each end member 13 is provided with a pair of tubular bosses 14 spaced longitudinally thereof and which receive corresponding ends of a pair of tubular bars 16 arranged to extend between the heads 13 in spaced, substantially parallel, relation to each other. The bars 16 may be fixedly secured to the heads 13 in any suitable manner so as to form a unitary structure therewith which may be readily moved longitudinally of the rails 10 for bringing the same under any desired portion of the chassis of the automobile supported by the rails.

The car rocking implement shown in the drawing comprises a relatively short cylinder 18 having an upper head 19 and a lower head 20 secured to the ends thereof by any suitable means such as bolts 21 extending through suitable apertures provided in the upper head 19 and screw-threaded in the lower head 20. Mounted for reciprocative movement in the cylinder 18 is a piston 22 which has a piston rod 23 connected therewith to extend upwardly through a suitable aperture provided in the upper head 19 and a central boss 24 formed on said head. The piston and rod assembly thus formed operatively support a suitable jack 26 which, in this instance, is of the screw type.

The jack 26 comprises a screw-threaded rod 27 which is rotatably and slidably received in a central bore 28 extending downwardly through the piston rod 23. The upper end of the screw 27 carries a lifting head 29, while a nut 30 is screw-threaded on screw 27 beneath the head 29 for engagement with the upper end of the piston rod 23 to be supported thereby. The nut 30, in this instance, is provided with a plurality of radially extending arms 31 which have sockets 32 for receiving a suitable lever (not shown) by which the nut may be rotated for raising and lowering the screw 27 and head 29.

The cylinder 18 as indicated in the drawing is provided with a suitable fluid conveying means designated by the character 35 adapted to be operatively connected by a flexible hose or other suitable means (not shown) to a suitable source of fluid supply for admitting air to and exhausting air from the space between the piston 22 and the lower end portion of the cylinder to vibrate the piston through a short path. This fluid conveying means 35 is shown in Figure 3 connected with a block member 36 which, in turn, is secured to the lower cylinder head 20 by a screw 37. The head 36 is provided with a fluid passage 38 communicating with the fluid conveying means 35 and with an L-shaped fluid passage 39 provided in the lower head 20 and which, in turn, communicates with the interior of the cylinder 18 beneath the piston 22.

The car rocking implement described thus far is of conventional construction and the novel feature of this invention comprises in providing the cylinder member 18 with two sets of holding elements 40 and 41 respectively. The holding elements 40 comprise a pair of arms or lugs which extend outwardly from the upper head 19 and are preferably made integral with said head. These arms or lugs 40 are arranged at diametrically opposite sides of the head 19 and are provided with concave or arcuate surfaces 42 at the under side thereof for receiving the tubular bars 16. The lower positioned holding elements 41, in this instance, comprise two pairs of arms or lugs which extend outwardly from the lower head 20 and are preferably formed integral therewith. The pairs of arms or lugs 41 are arranged at opposite sides of the cylinder 18 with the lugs of each pair arranged in spaced relation to each other. These lugs or arms are spaced apart a distance slightly less than the distance between the bars 16 so as to be readily received between said bars when the upper holding elements 40 are being brought into and out of engagement with the bars. It is preferable that the holding elements 40 and 41 be arranged in right-angular relation with respect to each other so as to provide for the easy operation of the cylinder when moving the same to bring the holding elements into contact with the supporting bar 16. The lower holding elements 41, like the upper elements 40, have lower arcuate or concave surfaces 43 which are adapted to receive the bars 16 for maintaining the cylinder against lateral movement with respect to the bars 16 and at the same time provide for movement of the cylinder longitudinally of said bars to bring the jack lifting head 29 into alignment with the desired overlying portion of the automobile chassis.

In operation it will be understood that the cradle 12, as hereinbefore stated, may be adjusted longitudinally of the rails 10 to bring the bars 16 under the portion of the car or automobile mounted on the rails in which it is desired to bring the car rocking implement into engagement. Furthermore, the implement may be adjusted laterally of the supporting rails by moving the same along the bars 16. It will also be understood that the lifting head 29 of the jack may be brought into engagement with the under portion of the car or automobile by manipulating the screw 27 and nut 30 in the usual manner.

It is preferable that the car rocking implement be supported by the cradle 12 when not in use as well as when being used to vibrate a car chassis. In order, therefore, that cars or automobiles of all makes and road clearances may freely pass over the rocking implement when being brought into and out of cooperative relation with the rails 10, the implement is usually supported by the engagement of the upper holding elements 40 to the cradle bars 16 so that the implement will extend a minimum distance above the cradle. When the implement is in this lower position, the same may be brought into operative engagement with cars having a relatively low hung chassis or frame by use of the jack 26 as will be readily understood. When it is necessary to elevate the car rocking implement in order that the jack may be brought into operative engagement with the chassis of a car or automobile having a relatively high road clearance, this may be readily accomplished by bringing the lower holding elements 41 into engagement with the cradle supporting bars 16. This positioning of the implement will maintain the same in an elevated position so that a maximum height of the jack head 29 may be obtained. After the operation to be performed by the car rocking implement in its uppermost position has been completed, said implement is returned to its lowermost position by again bringing the upper holding elements 40 into engagement with the supporting bars 16. These changes in the vertical position of the rocking implement are readily accomplished by producing the required vertical movement thereof and at the same time, turning the implement substantially one-quarter of a revolution so as to bring one set of holding elements out of alignment with the bars 16 and bring the other set of holding elements into alignment with said bars.

Although the construction and operation of my improvement is relatively simple, I do not wish to be limited to the exact construction shown as it is obvious that certain changes may be made therein without departing from the spirit of the invention as set forth in the appended claim.

I claim:

A car rocking apparatus adapted for use in conjunction with a vehicle lift of the type having a pair of spaced, parallel vehicle-supporting rails, comprising, in combination, a cradle adapted to be moved along said rails, and a rocking implement removably and adjustably supported by said cradle, said cradle having end members adapted to be supported by said rails and having a pair of spaced, parallel supporting bars extending between said end members, said rocking implement having a body of such size as to be received between said supporting bars and having two sets of rigid arms projecting from said body, each set being adapted selectively to engage said supporting bars adjustably along the length thereof, one set of said arms being located at opposite sides and near the upper end of said body and the other set of said arms being located at opposite sides and near the lower end of said body, and said sets of arms being so located on said body that when one set is engaged with said supporting bars the other set is disposed within the area bounded by said supporting bars, whereby said implement may be supported on said cradle by either set of said arms at either of two corresponding vertical positions with respect thereto and may be adjusted along the supporting bars of said cradle on the selected set of said arms.

ROBERT J. SCHAROUN.